United States Patent
Li et al.

(10) Patent No.: US 10,580,411 B2
(45) Date of Patent: Mar. 3, 2020

(54) TALKER CHANGE DETECTION

(71) Applicant: Cirrus Logic International Semiconductor Ltd., Edinburgh (GB)

(72) Inventors: Ying Li, Chandler, AZ (US); Ghassan Maalouli, Scottsdale, AZ (US); Narayan Kovvali, Tempe, AZ (US); Seth Suppappola, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 102 days.

(21) Appl. No.: 15/714,296

(22) Filed: Sep. 25, 2017

(65) Prior Publication Data

US 2019/0096408 A1 Mar. 28, 2019

(51) Int. Cl.

| | |
|---|---|
| *G10L 21/028* | (2013.01) |
| *G10L 17/00* | (2013.01) |
| *G10L 15/22* | (2006.01) |
| *G10L 17/06* | (2013.01) |
| *H04R 1/40* | (2006.01) |
| *H04R 3/00* | (2006.01) |
| *G10L 25/21* | (2013.01) |

(Continued)

(52) U.S. Cl.
CPC .............. *G10L 17/005* (2013.01); *G01S 5/18* (2013.01); *G06F 3/167* (2013.01); *G10L 15/22* (2013.01); *G10L 17/00* (2013.01); *G10L 17/06* (2013.01); *G10L 25/21* (2013.01); *H04R 1/406* (2013.01); *H04R 3/005* (2013.01); *G10L 21/028* (2013.01); *G10L 2015/223* (2013.01); *H04R 2420/07* (2013.01)

(58) Field of Classification Search
CPC .................................................... G10L 21/028
See application file for complete search history.

(56) References Cited

U.S. PATENT DOCUMENTS

| | | | | |
|---|---|---|---|---|
| 8,103,023 | B2* | 1/2012 | Merks | G10K 11/341 381/150 |
| 9,066,170 | B2* | 6/2015 | Forutanpour | H04R 3/005 |
| 9,119,012 | B2* | 8/2015 | Ikizyan | H04R 3/00 |

(Continued)

FOREIGN PATENT DOCUMENTS

JP 2010026361 A 2/2010

OTHER PUBLICATIONS

M. Omologo and P. Svaizer, "Use of the Crosspower-Spectrum Phase in Acoustic Event Location," IEEE Transactions on Speech and Audio Processing, vol. 5, No. 3, May 1997.*

*Primary Examiner* — Feng-Tzer Tzeng
(74) *Attorney, Agent, or Firm* — Norton Rose Fulbright US LLP

(57) ABSTRACT

A change in the phase pattern of the inter-mic impulse response (IMIR), determined by a cross power spectral density, may be used to detect the appearance of a new talker or a dramatic movement of the current talker. For example, the phase of the IMIR is dependent on a location of the sound source relative to the microphone array. Any signal originating from a specific location has a specific phase pattern on the IMIR across the frequency domain. By comparing phase patterns of the current cross power spectral density with a recorded talker phase profile, a talker change can be detected. This detection can be used to control signal processing algorithms. For example, when talker change is detected, the step size of an adaptive filter can be increased to track the changes efficiently.

17 Claims, 10 Drawing Sheets

(51) Int. Cl.
*G01S 5/18* (2006.01)
*G06F 3/16* (2006.01)

(56) References Cited

U.S. PATENT DOCUMENTS

| | | |
|---|---|---|
| 9,640,197 B1 | 5/2017 | Fukuda et al. |
| 2011/0131044 A1* | 6/2011 | Fukuda .................. G10L 15/20 |
| | | 704/246 |
| 2014/0219471 A1* | 8/2014 | Deshpande ............ H04R 3/005 |
| | | 381/92 |
| 2017/0150255 A1* | 5/2017 | Wang ..................... G04G 21/06 |

* cited by examiner

TALKER CHANGE DETECTION

FIELD OF THE DISCLOSURE

The instant disclosure relates to audio processing. More specifically, portions of this disclosure relate to far-field audio processing.

BACKGROUND

Far-field input in an audio system refers to an audio signal originating a far distance from the microphone(s). As examples, far-field input may be from a talker in a large room, a musician in a large hall, or a crowd in a stadium. Far-field input is contrasted by near-field input, which is an audio signal originating near the microphone(s). An example near-field input is a talker speaking into a cellular phone during a telephone call. Processing audio signals in the far field present additional challenges because the strength of an audio signal decays with the distance of the source from the microphone. The farther a person is from a microphone, the quieter the person's voice is when it reaches the microphone. Additionally, speech is reduced in clarity due to a decrease in the direct-to-reverberant ratio. Furthermore, noise sources can be present, interfering with the desired talker's voice. For example, a radio playing in the room while a person is talking makes the talker difficult to hear. When the talker is closer to the microphone than the interference source is, such as in near-field processing, the talker's voice is higher in amplitude than the interference source. When the talker is far from the microphone, such as in far-field processing, the talker's voice can be of the same or lower amplitude than the interference source. Thus, the person's voice is more difficult to discern in the presence of interference in far-field processing.

One application of far-field technology is in smart home devices. A smart home device is an electronic device configured to receive user speech input, process the speech input, and take an action based on the recognized voice command. An example smart home device in a room is shown in FIG. 1. For example, living room 100 may include a smart home device 104. The smart home device 104 may include a microphone, a speaker, and electronic components for receiving speech input. Individuals 102A and 102B may be in the room and communicating with each other or speaking to the smart home device 104. Individuals 102A and 102B may be moving around the room, moving their heads, putting their hands over their faces, or taking other actions that change how the smart home device 104 receives their voices. Also, sources of noise or interference, audio signals that are not intended to activate the smart home device 104 or that interfere with the smart home device 104's reception of speech from individuals 102A and 102B, may exist in the living room. Some sources of interference include sounds from a television 110A and a radio 110B. Other sources of interference not illustrated may include noises from washing machines, dish washers, sinks, vacuums, microwave ovens, music systems, etc.

The smart home device 104 may incorrectly process voice commands because of the interference sources. Speech from the individuals 102A and 102B may not be recognizable by the smart home device 104 because the amplitude of interference drowns out the individual's speech. In some situations, speech from a noise source, such as television 110A, may be incorrectly recognized as a speech command. For example, a commercial on the television 110A may encourage a user to "buy product X" and the smart home device 104 may process the speech and automatically order product X. Additionally, speech from the individuals 102A and 102B may be incorrectly processed. For example, user speech for "buy backpacks" may be incorrectly recognized as "buy batteries" due to interference from the interference sources.

Shortcomings mentioned here are only representative and are included simply to highlight that a need exists for improved electrical components, particularly for audio processing employed in consumer-level devices, such as audio processing for far-field pickup in smart home devices. Embodiments described herein address certain shortcomings but not necessarily each and every one described here or known in the art. Furthermore, embodiments described herein may present other benefits than, and be used in other applications than, those of the shortcomings described above. For example, similar shortcomings may be encountered in other audio devices, such as audio systems or mobile phones, and embodiments described herein may be used in mobile phones to solve such similar shortcomings as well as other shortcomings.

SUMMARY

Audio processing, including voice command recognition, may be improved by using new techniques for processing microphone signals received by an electronic device. Two or more microphones may be used to record sounds from the environment, and the received sounds processed to obtain information regarding the environment. For example, audio signals from two or more microphones may be processed to spatially identify noise sources. The identified noise sources can be excluded from speech recognition processing to prevent accidental triggering of commands. The identification of the noise sources may also be used to filter out the identified noise sources from the microphone signals to improve the recognition of desired speech.

Other information regarding the environment may also be obtained from the multiple microphone signals. For example, the microphone signals may be processed to identify by inferring the location of a talker. The location of the talker can be used to identify particular talkers and/or other characteristics of particular talkers. For example, the far-field processing may be used to differentiate between two talkers in a room and prevent confusion that may be caused by two active talkers. By improving these and other aspects of audio signal processing, far-field audio processing may be used to enhance smart home devices. Although examples using smart home devices are provided in the described embodiments, the far-field audio processing may enhance operation of other electronic devices, such as cellular phones, tablet computers, personal computers, portable entertainment devices, automobile entertainment devices, home entertainment devices. Furthermore, aspects of embodiments described herein may also be applied to near-field audio processing, and the described embodiments should not be considered to limit the invention to far-field audio processing. For example, embodiments of methods and apparatuses described herein may be applied to other processing involving spatially fixed interference sources and microphone arrays.

A change of talker in an audio sequence is difficult to detect when multiple talkers are present. The difficulties are increased when the background noise is loud. The difficulties are further increased when the noise is a speech-like signal, such as an advertisement or news program playing from a television (TV). When multiple microphones are recording far-field audio, phase information from the microphones may be used to identify a change of talker or a movement of the talker. A change in the phase pattern of the inter-mic impulse response (IMIR) may be used to detect the appearance of a new talker, or the talker's movement. The phase of the IMIR is dependent on a location of the sound source relative to the microphone array. The phase of the IMIR is independent of the signal content. This relationship is true for either free space or reverberant environments. Any signal originating from a specific location has a specific phase pattern across the frequency domain. By comparing phase patterns of the received signal with a previous talker profile, a talker change or talker movement can be detected. This detection can be further used to control other signal processing algorithms. For example, when the talker changes to an unauthorized user, the new talker's voice commands may be ignored. One technique for calculating the inter-microphone impulse response phase involves the calculation of the phase of the cross power spectral density between two microphones.

A method for processing signals from a microphone array to detect a change of talker may include receiving a first microphone signal and a second microphone signal from microphones at different locations in a microphone array relative to an audio source. The first microphone signal and second microphone signal may be received from a first microphone and a second microphone. This first and second microphone may be referred to as a microphone pair. Phase profiles may be determined for the microphone pair for two different time periods. Determining the phase profile may involve determining a phase of cross power spectral density between the first microphone signal and the second microphone signal. With the two different phase profiles calculated, the phase profiles may be compared to determine if a change in talker occurred between the recording of the microphone signals during the first time period and the recording of the microphone signals during the second time period. A sufficient change in the profiles indicates a change in location of the talker. When the change is significant and occurs over a short period of time, the talker can assume to not be moving from one location to another, instead, a new talker is assumed to begin talking. One manner of comparing the phase profiles to determine a change in talker may include calculating a dot product between the first talker phase profile and the second talker phase profile and determining whether the dot product is higher than a threshold value. The similarity measure can be not only a dot product, but also some distance measure between two profiles.

When a new talker is detected, processing of received audio during or after the second time period may be adjusted to the new talker. For example, if the first talker is a public user and the second talker is a private user then data recorded in the second time period may not be permitted to be transmitting across a public network. As another example, if the first talker is an authorized purchaser and the second talker is not an authorized purchaser, then voice commands to purchase goods or services may be ignored from the second talker. As a further example, if the first talker is logged into an account, then the second talker may be denied access to account information, such as recent purchases made by the first talker. As still a further example, a beamformer may be controlled to improve reception of speech from the second talker by adjusting beamformer parameters to improve signal-to-noise ratio (SNR) of audio received from the second talker's location than the first talker's location. Although these examples can be solved by using some expensive speaker identification algorithms, the proposed approach is more efficient and has a lower computational complexity.

Any of the functionality described herein, such as the talker detection described above, may be incorporated into an integrated circuit (IC). One such IC for the talker detection functionality is an audio controller for embedding in a smart home device. The audio controller may include logic circuitry configured to execute firmware or software containing instructions. Example instructions include instructions to compute a phase of cross power spectral density between the first microphone signal and the second microphone signal and/or to compute a dot product between the first talker phase profile and the second talker phase profile.

Electronic devices incorporating functions for speech recognition, audio processing, audio playback, smart home automation, and other functions may benefit from the audio processing described herein. Hardware for performing the audio processing may be integrated in hardware components of the electronic devices or programmed as software or firmware to execute on the hardware components of the electronic device. The hardware components may include processors or other components with logic units configured to execute instructions. The programming of instructions to be executed by the processor can be accomplished in various manners known to those of ordinary skill in the art. Additionally, or alternatively to integrated circuits comprising logic units, the integrated circuits may be configured to perform the described audio processing through discrete components, such as transistors, resistors, capacitors, and inductors. Such discrete components may be configured in various arrangements to perform the functions described herein. The arrangement of discrete components to perform these functions can be accomplished by those of ordinary skill in the art. Furthermore, discrete components can be combined with programmable components to perform the audio processing. For example, an analog-to-digital converter (ADC) may be coupled to a digital signal processor (DSP), in which the ADC performs some audio processing and the DSP performs some audio processing. The ADC may be used to convert an analog signal, such as a microphone signal, to a digital representation of sounds in a room. The DSP may receive the digital signal output from the ADC and perform mathematical operations on the digital representation to identify and/or extract certain sounds in the room. Such a circuit including analog domain components and digital domain components may be referred to as a mixed signal circuit, wherein "mixed" refers to the mixing of analog and digital processing.

In some embodiments, the mixed signal circuit may be integrated as a single integrated circuit (IC). The IC may be referred to as an audio controller or audio processing because the IC is configured to process audio signals as described herein and is configured to provide additional functionality relating to audio processing. However, an audio controller or audio processor is not necessarily a mixed signal circuit, and may include only analog domain components or only digital domain components. For example, a digital microphone may be used such that the input to the audio controller is a digital representation of sounds and analog domain components are not included in the audio controller. In this configuration, and others, the integrated circuit may have only digital domain components. One example of such a configuration is an audio controller having a digital signal processor (DSP). Regardless of the configuration for processing audio, the integrated circuit may include other components to provide supporting functionality. For example, the audio controller may include filters, amplifiers, equalizers, analog-to-digital converters (ADCs), digital-to-analog converters (DACs), a central processing unit, a graphics processing unit, a radio module for wireless communications, and/or a beamformer. The audio controller may be used in electronic devices with audio inputs and/or outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, smart thermostats, smart lighting control systems, smart appliances (e.g., washer/dryer), smart assistants, and the like.

In embodiments described herein, "far-field audio processing" may refer to audio processing for "far-field" audio sources, where "far-field" refers to a source distance from a microphone array such that the wave front of the sound pressure wave arriving at the array is sufficiently flat. Far-field may also be characterized as the ratio of the energies of the direct component of the sound to its reverberant part. Factors that affect the far-field condition include wavelength, array dimension, and others. Embodiments described herein for far-field audio processing may be applied to other types of audio processing.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
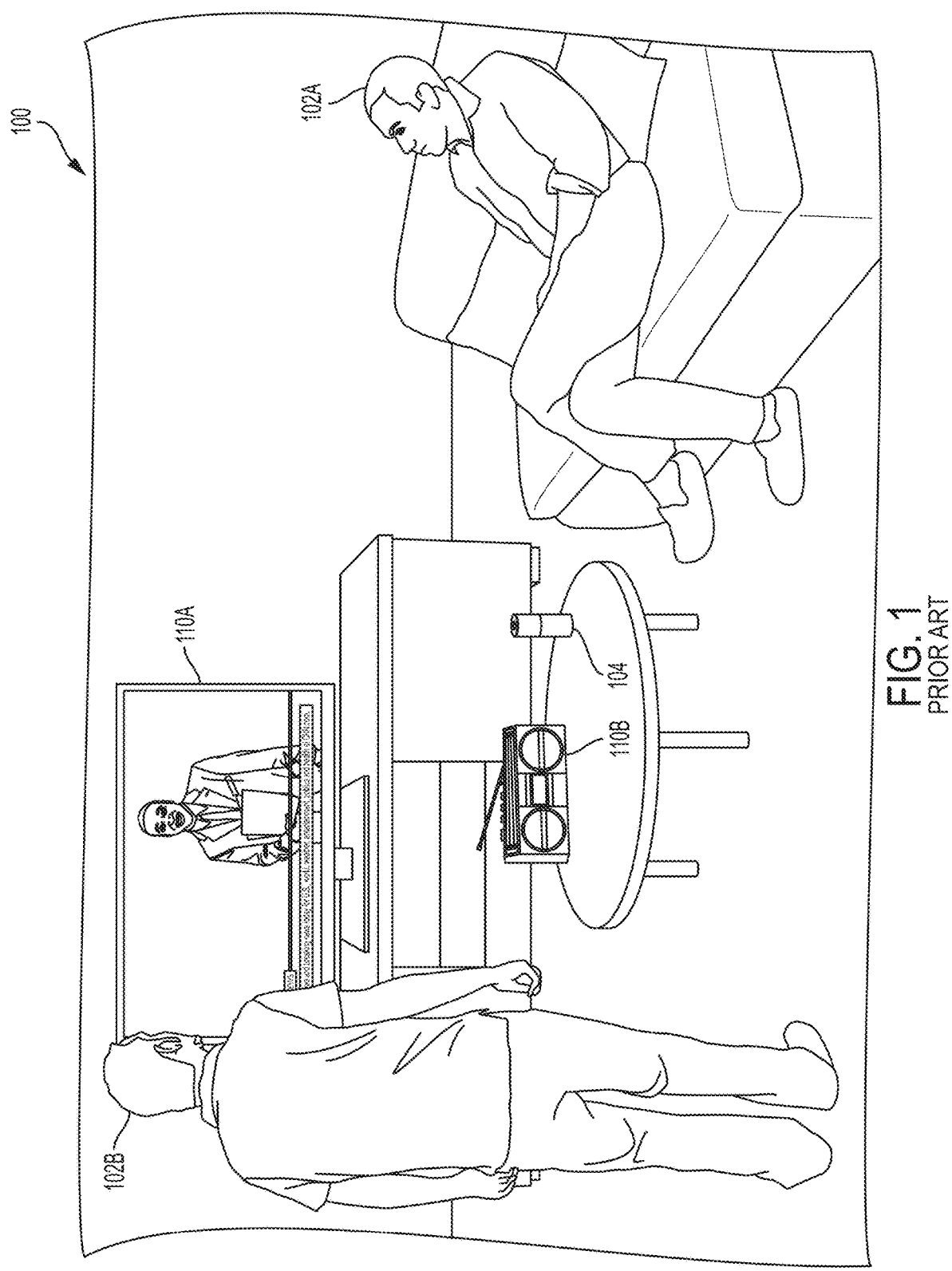
FIG. 1 is an illustration of a conventional smart home device in a room.
Figure 2:
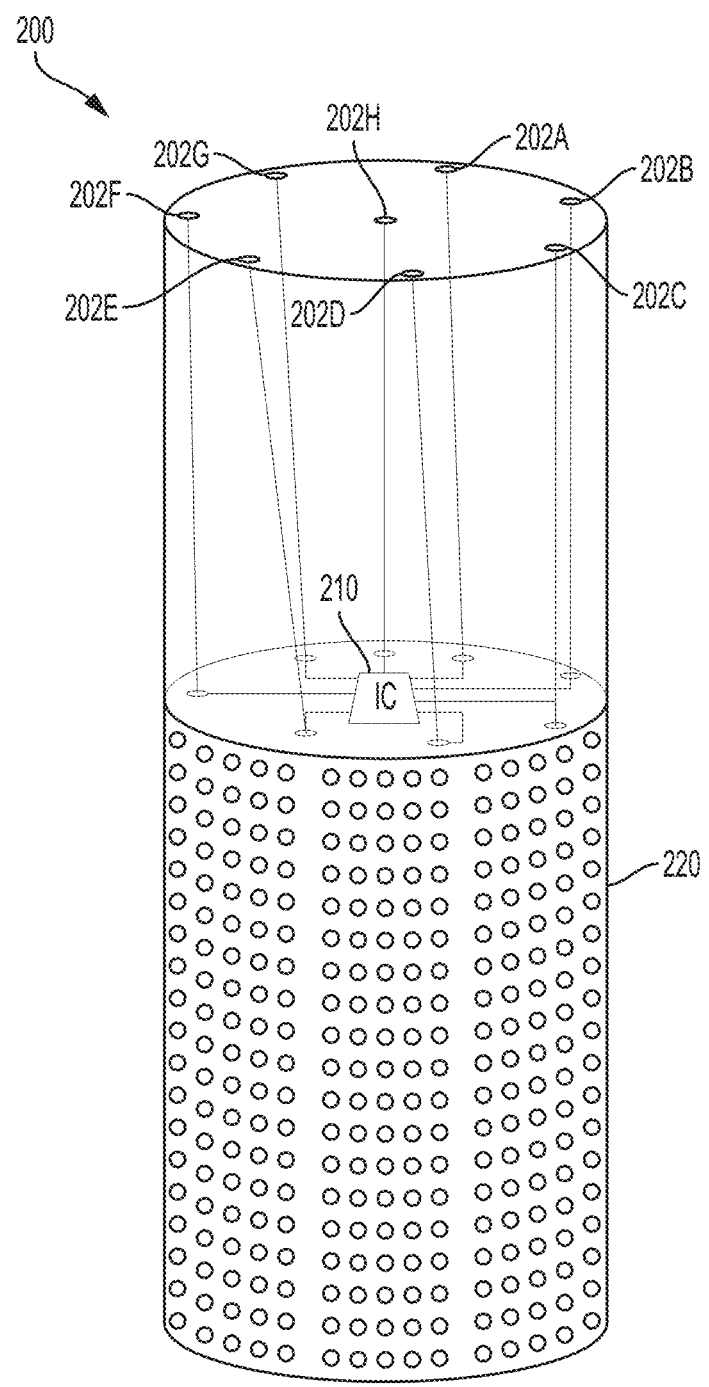
FIG. 2 is a perspective view of a smart home device with components used for audio processing according to some embodiments of the disclosure.

Far-field audio processing may use microphone signals from two or more microphones of an electronic device. An electronic device, such as smart home device 200 of FIG. 2, may include a microphone array 202 including microphones 202A-G. The microphones 202A-G may be any microphone device that transduces pressure changes (such as created by sounds) into an electronic signal. One example device is a miniature microphone, such as a micro-electro-mechanical system (MEMS) microphone. Another example is a digital microphone (DMIC). The microphones 202A-G may be arranged in various configurations on the smart home device 200. The different positions result in each of the microphones 202A-G receiving different audio signals at any moment in time. Despite the difference, the audio signals are related as corresponding to the same environment and the same sound sources in the environment. The similarity and the difference of the audio signals may be used to derive characteristics of the environment and/or the sound sources in the environment.

An integrated circuit (IC) 210 may be coupled to the microphones 202A-G and used to process the signals produced by the microphones 202A-G. The IC 210 performs functions of the far-field audio processing of the invention, such as described in the embodiments of FIG. 7 and FIG. 8. The output of the IC 210 may vary in different embodiments based on a desired application. In smart home device 200, the IC 210 may output a digital representation of audio received through the microphones 202A-G and processed according to embodiments of the invention. For example, processing of the microphone signals may result in a single output audio signal containing an enhanced signal-to-noise ratio that allows for more accurate and reliable recognition of speech from the desired talker. The output audio signal may be encoded in a file format, such as MPEG-1 Layer 3 (MP3) or Advanced Audio Coding (AAC) and communicated over a network to a remote device in the cloud. The remote device may perform speech recognition on the audio file to recognize a command in the speech and perform an action based on the command. The IC 210 may receive an instruction from the remote device to perform an action, such as to play an acknowledgement of the command through a speaker 220. As another example, the IC 210 may receive an instruction to play music, either from a remote stream or a local file, through the speaker 220. The instruction may include an identifier of a station or song obtained through speech recognition performed on the audio signal from the far-field audio processing of the invention.

The microphones 202A-H are illustrated as integrated in a single electronic device in example embodiments of the invention. However, the microphones may be distributed among several electronic devices. For example, in some embodiments, the microphones 202A-H may be in discrete devices around the living room. Those discrete devices may wirelessly communicate with the smart home device 200 through a radio module in the discrete device and the smart home device 200. Such a radio module may be a RF device operating in the unlicensed spectrum, such as a 900 MHz RF radio, a 2.4 GHz or 5.0 GHz WiFi radio, a Bluetooth radio, or other radio modules.

Figure 3:
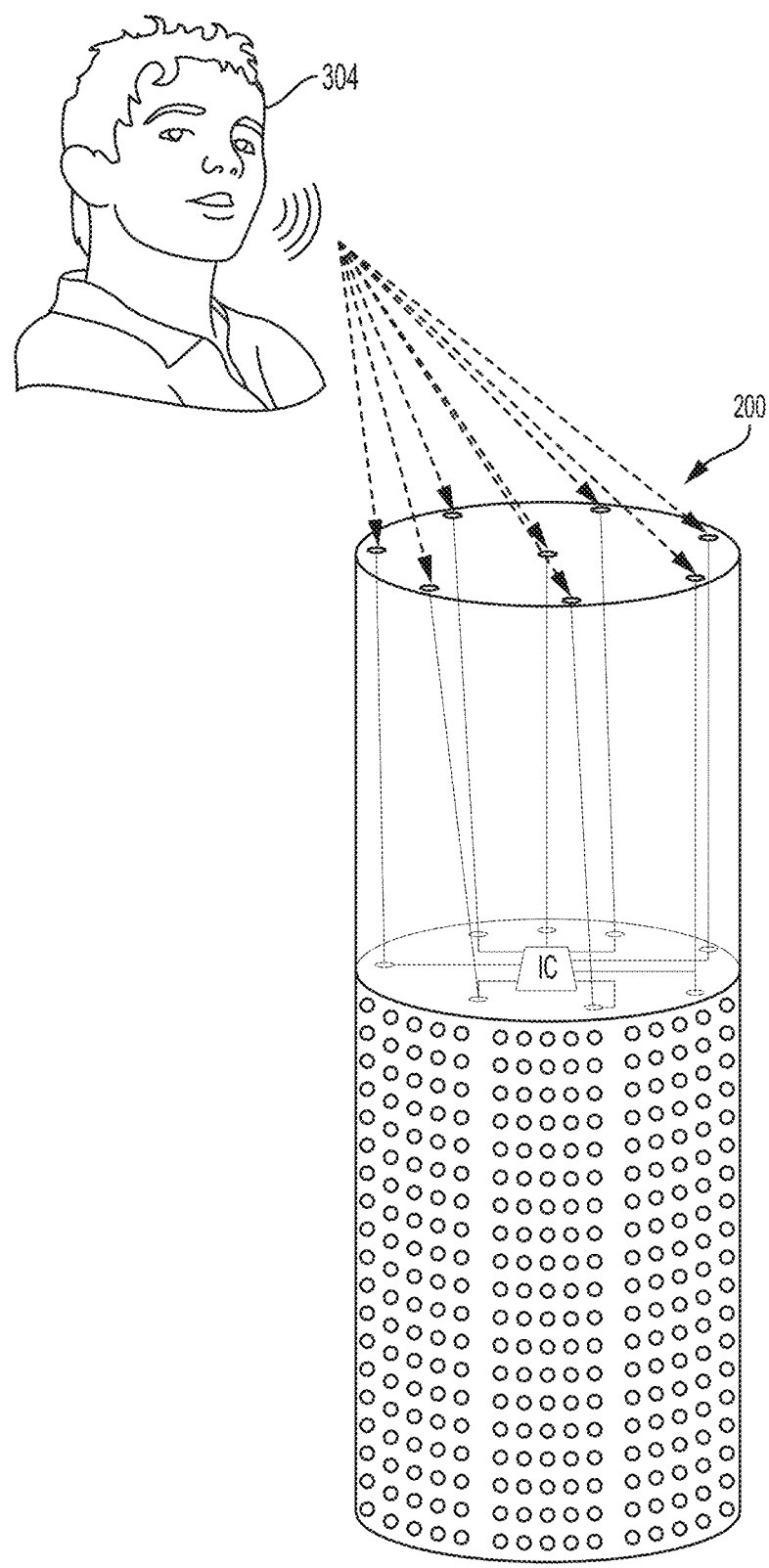
FIG. 3 is an illustration of different times of arrival of sound at two or more microphones according to some embodiments of the disclosure.

Microphones 202A-H sense sound pressure changes in the environment. Each microphone is at a different distance to the source of the sound. The different sound propagation and arrival times are illustrated in FIG. 3. A talker 304 may speak towards the microphones 202A-H. The distance from the talker's 304 mouth to each of the microphones 202A-H is different, resulting in each of the microphones 202A-H with a different time delay. Other than this difference, the audio signals received at each of the microphones 202A-H may be very similar because all of the microphones 202A-H are recording the same sounds in the same environment. This assumes that the sound propagation is in free-field. When reflecting surfaces are present as in a real room, the sound arriving at the microphones includes both direct propagation path and reflections. The microphone signals then include constructive and destructive interference of the full sound propagation from the source to the microphones. As a result, the signals at the different microphones may no longer be simply time-delayed with respect to each other.

Figure 4:
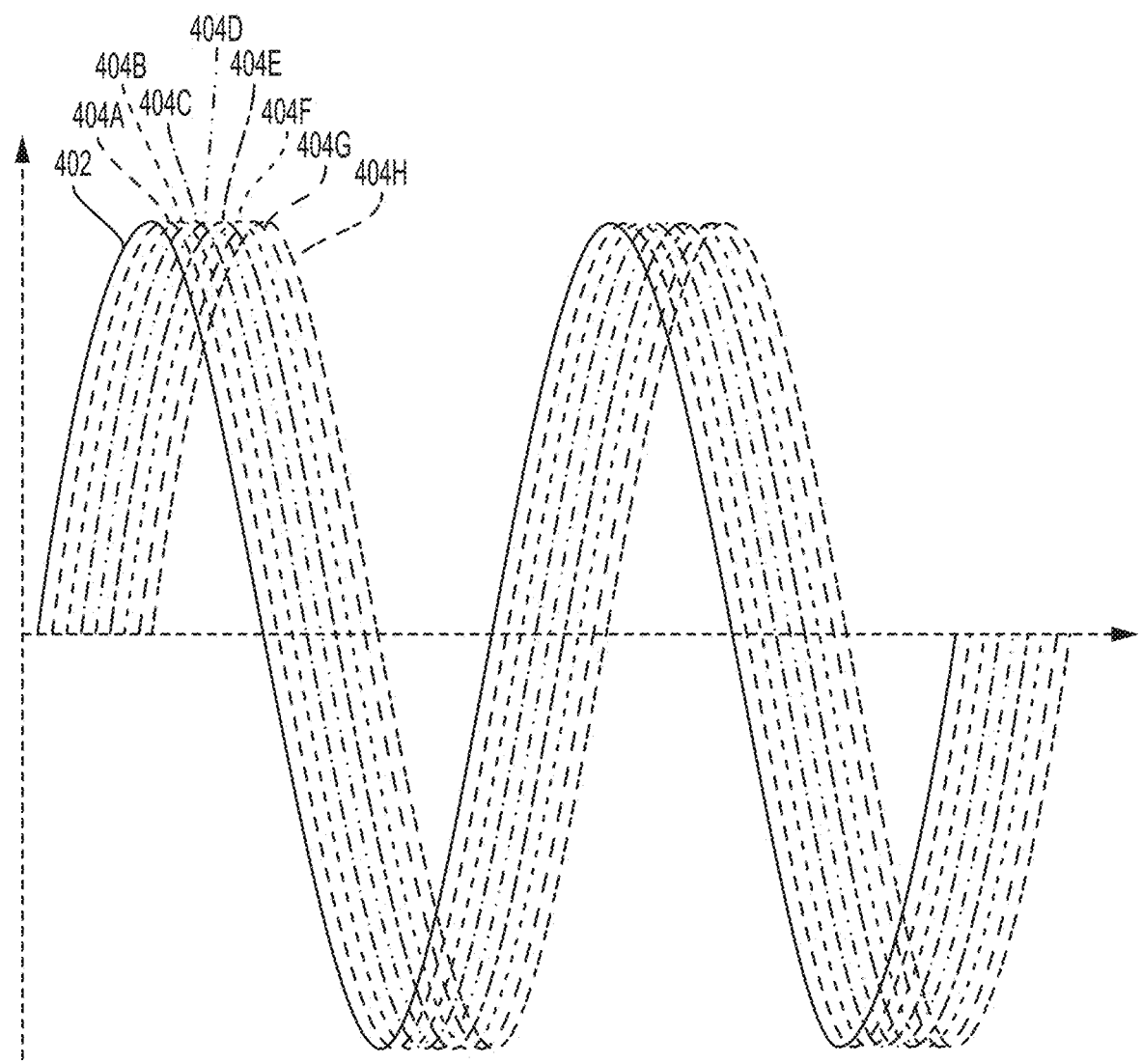
FIG. 4 is a graph illustrating tonal microphone signals from an array of microphones at different locations on an electronic device according to some embodiments of the disclosure.

The similarity and difference in the audio signals received by each of the microphones is reflected in the different microphone inputs received at the IC 210 from each of the microphones 202A-H. FIG. 4 is a graph illustrating microphone signals from an array of microphones at different locations on an electronic device, which may be used in some embodiments of the disclosure. A sound in an environment creates a pressure wave that spreads throughout the environment and decays as the wave travels. An example measurement of the pressure wave at the location of the sound source is shown as signal 402. Each of the microphones 202A-H receive the signal 402 later as the sound travels through the environment and reaches each of the microphones 202A-H. The closest microphone, which may be microphone 202A, receives signal 404A. Signal 404A is shown offset from the original signal 402 by a time proportional to the distance from the source to the microphone 202A. Each of the other microphones 202B-H receives the sound at a slightly later time as shown in signals 404B—H based on each of the microphones 202B-H distance from the source or, relatively, microphone 202A.

Each of the signals 404A-H recorded by microphones 202A-H may be processed by IC 210. IC 210 may filter the signals and calculate signal characteristics, such as phase, between each of the pairs of microphones. For example, an inter-microphone frequency-dependent phase profile may be calculated between the signals 404A and 404B corresponding to microphones 202A and 202B, respectively. The phase profile on the timing difference between the signal 404A and 404B, as governed by the full sound propagation from a source to the microphones (including the direct path, room reverberation, and diffraction effects) and uniquely captures the acoustic path from the source to that microphone pair in the room. The inter-microphone frequency-dependent phase profile may be calculated for other pairs of microphones, such as between 404A-C, 404A-D, 404A-E, 404A-F, 404A-G, and 404A-H, likewise for 404B-C, 404B-D, 404B-E, 404B-F, 404B-G, 404B-H, and likewise for other pairs of microphones. The phase information may be used in far-field audio processing to improve speech recognition, particularly in noisy environments.

Figure 5:
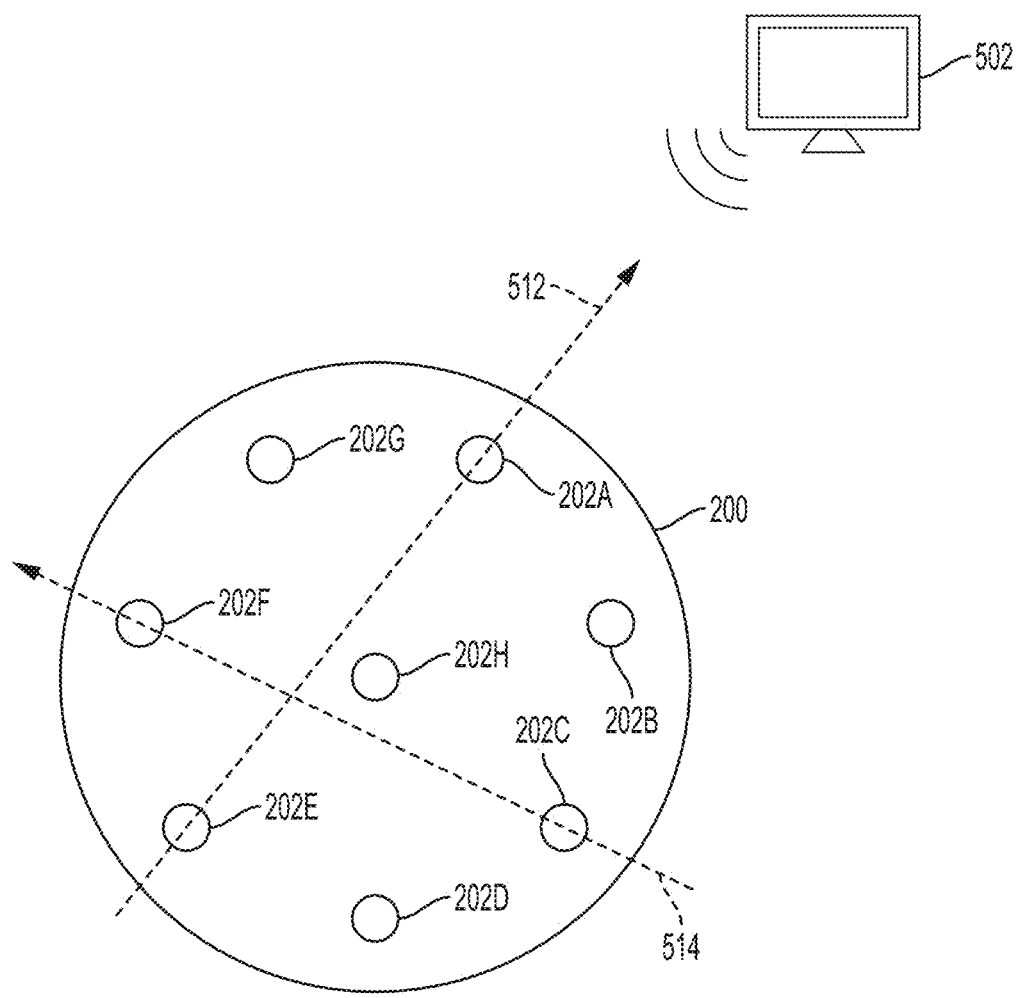
FIG. 5 is an illustration of phase difference for pairs of microphones in the array according to some embodiments of the disclosure.

Processing may include computation and comparison of inter-microphone frequency-dependent phase profiles to identify a relative location. Assuming no reflections, or a near-field source, the pair of microphones aligned along a vector pointing in the direction of the sound source will have a larger inter-microphone phase than the pair of microphones aligned along a vector orthogonal to the direction of the sound source. FIG. 5 is an illustration of the inter-microphone phase for pairs of microphones in the array according to some embodiments of the disclosure. A television 502 may be in a direction along a vector 512 oriented from microphone 202A to microphone 202E. The inter-microphone phase calculated for the pair of microphones 202A and 202E for the television 502 may be the largest phase among any pair of microphones 202A-H. The inter-microphone phase calculated for the pair of microphones 202C and 202F along a vector 514 for the television 502 may be the smallest phase among any pair of the microphones 202A-H. The relative location of other sound sources may likewise be determined around the smart home device 200 by computing inter-microphone frequency-dependent phase profiles. Stationary sources, such as television 502, may appear as a sound source with an approximately constant inter-microphone frequency-dependent phase profile. Moving sources, such as human talkers, may appear as a sound source with a changing inter-microphone frequency-dependent phase profile. Stationary sources may be differentiated from moving sources through processing of the inter-microphone frequency-dependent phase profiles.

To capture a talker change event, signified by new speech from a different talker on one that has commenced to move, the phase pattern of the inter-microphone impulse response (IMIR) for one or more microphone pairs may be recorded. The IMIR is based on individual impulse responses from the sound source at the two microphones. The impulse response is parameterized by many variables. For example, in a room environment, the room impulse response is determined by the location of the sound source, the arrangement of the furniture, the reflection characteristics of the walls, and other effects like the room temperature and humidity. The phase of the cross power spectral density between two microphones is easy to compute and used as the phase of the IMIR. Sound sources from different locations in a room correspond to IMIR that are different in phase. Even a subtle change of the sound source location can result in a dramatic difference in the phase pattern. A talker profile can thus be tracked based on the instantaneous phase pattern. By comparing the similarity between the phase pattern of the received cross power spectral density and a known talker profile, the appearance of a new talker or a dramatic movement of the current talker can be detected if a calculated similarity value exceeds a predetermined threshold. This processing can work in very reverberant scenarios, in contrast with conventional direction of arrival methods that fail. The computations are also mathematically simple enough to be performed in real-time or near real-time on processors of limited capability.

Figure 6:
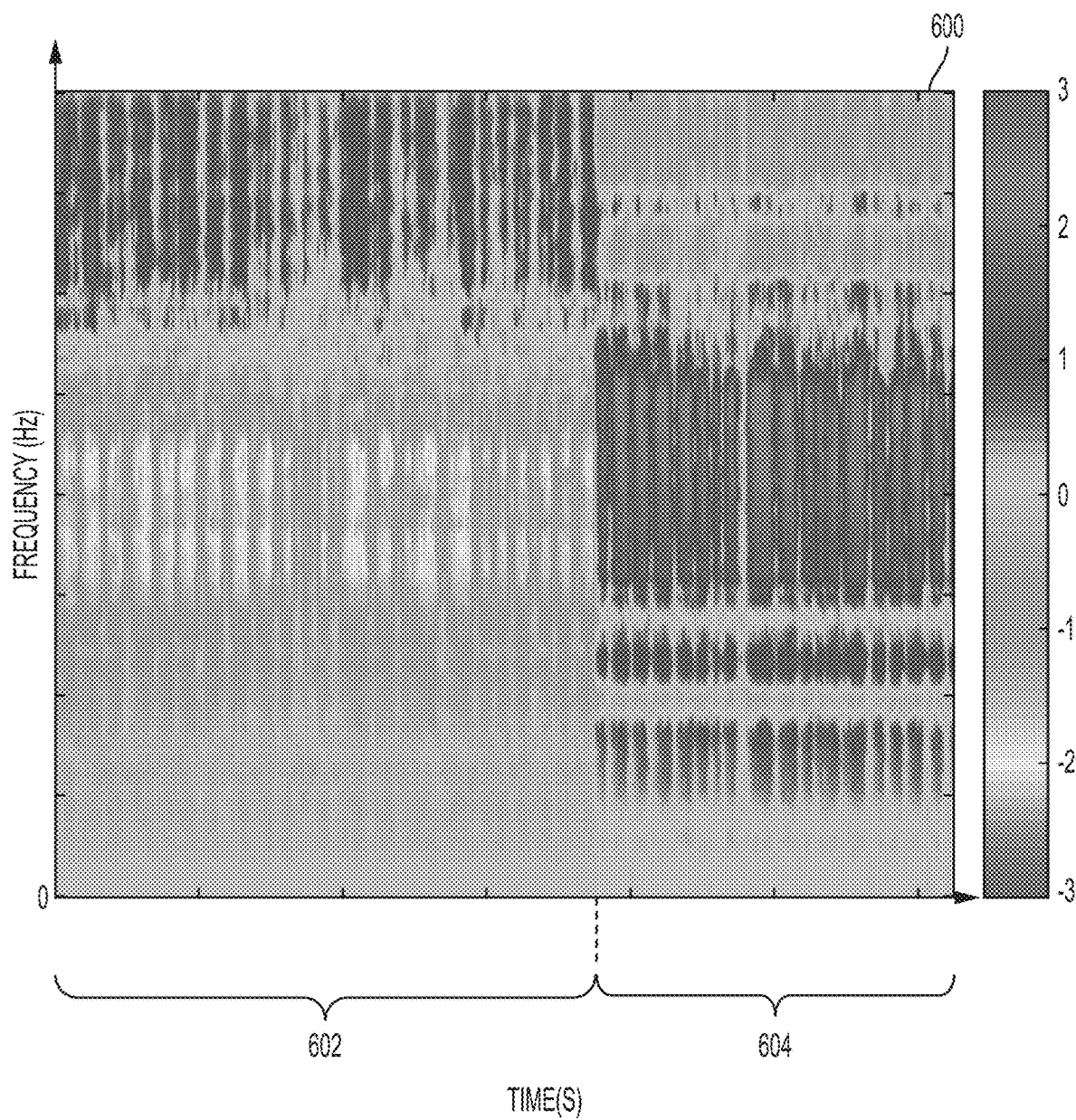
FIG. 6 is a graph illustrating phase profiles for a microphone pair used to determine a change in talker according to some embodiments of the disclosure.

Example phase profiles for different talkers computed according to aspects of the described processing is shown in FIG. 6. FIG. 6 is a graph illustrating phase profiles for a microphone pair used to determine a change in talker according to some embodiments of the disclosure. A graph 600 illustrates phase differences at different times along the x-axis and at different frequencies along the y-axis. A phase profile for a first talker during a first time period 602 is different from a phase profile for a second talker during a second time period 604. The first phase profile may be recorded and stored. During time period 604, the second phase profile is compared to the stored first phase profile and a similarity metric computed. When that similarity metric is larger than a threshold value, then a change in talker is detected.

Figure 7:
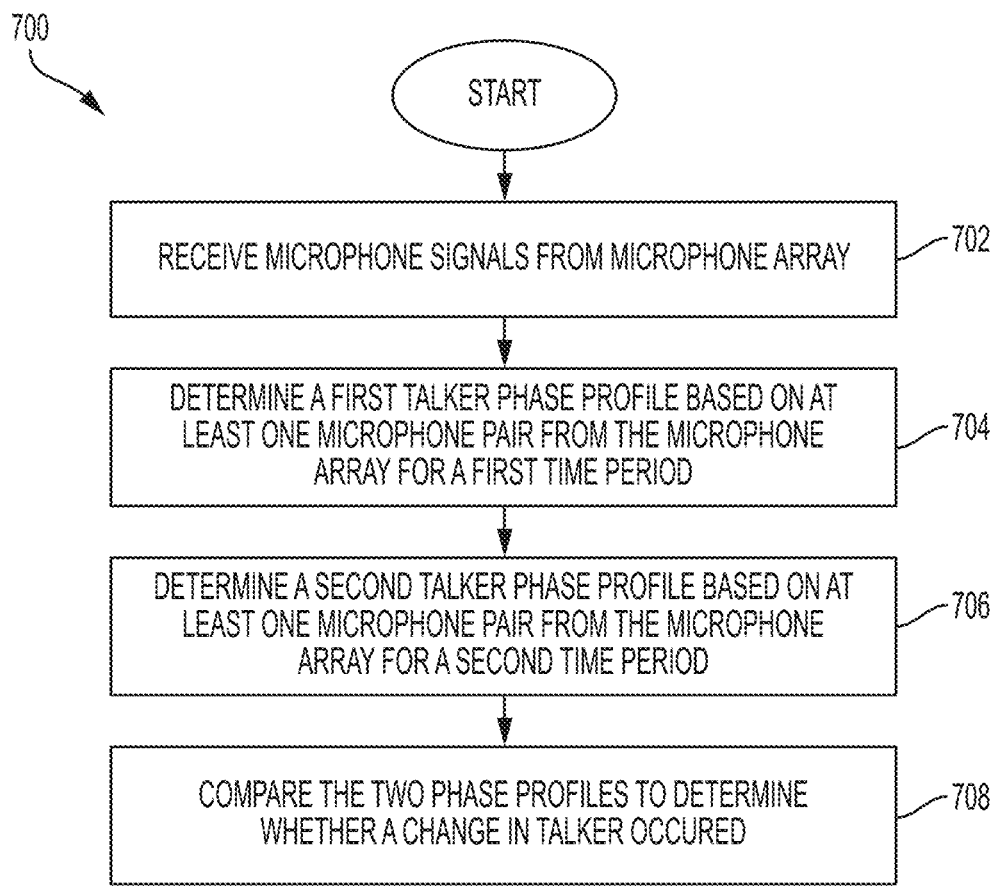
FIG. 7 is a flow chart illustrating an example method for determining whether a change in talker occurred according to some embodiments of the disclosure.

A method for determining a change in talker from time period 602 to time period 604 is illustrated in FIG. 7. FIG. 7 is a flow chart illustrating an example method for determining whether a change in talker occurred according to some embodiments of the disclosure. A method 700 may begin at block 702 with receiving microphone signals from a microphone array. At block 704, a first talker phase profile is determined based on at least one microphone pair from the microphone array for a first time period. One microphone pair may be used to determine a phase profile. More accurate talker determination may be accomplished by using multiple microphone pairs. At block 706, a second talker phase profile is determined based on at least one microphone pair from the microphone array for a second time period. At block 708, the two phase profiles of blocks 704 and 706 may be compared to determine whether a change in talker occurred.

Figure 8:
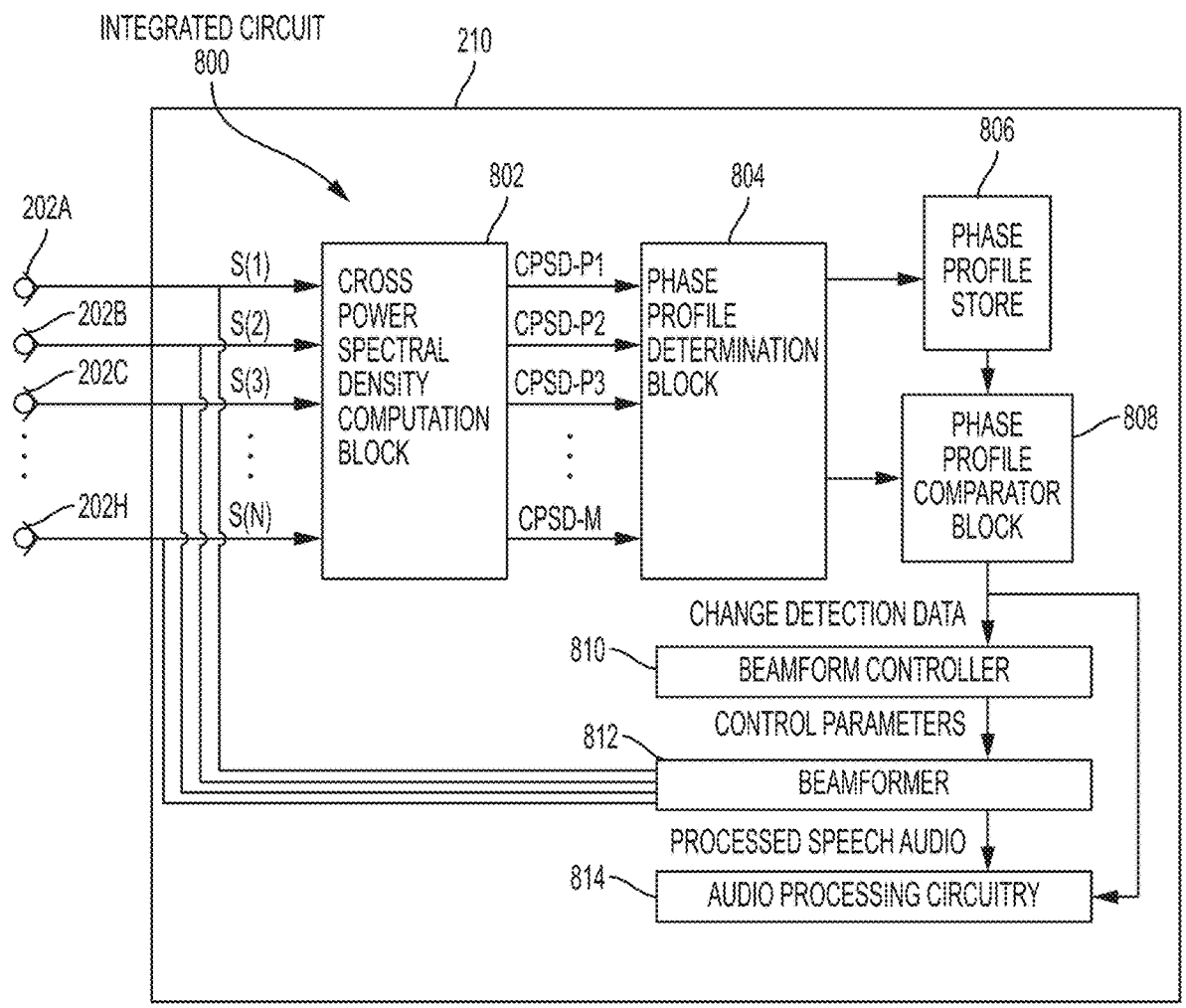
FIG. 8 is a block diagram illustrating an example integrated circuit for determining a change in talker occurred according to some embodiments of the disclosure.

One integrated circuit for processing microphone signals for determining a talker change as described in FIG. 7 is shown in FIG. 8. FIG. 8 is a block diagram illustrating an example integrated circuit for determining a change in talker occurred according to some embodiments of the disclosure. A talker change determination may be performed by circuitry 800, which may be implemented in integrated circuit (IC) 210. The IC 210 may receive microphone signals S(1), S(2), S(3), . . . S(N), from microphones 202A-H of a microphone array with N microphones. The signals are received by block 802 for computing a cross power spectral density (CPSD). The CPSD may be computed for each pair of microphones in the microphone array. Block 802 may generate signals CPSD-P1, CPSD-P2, CPSD-P3, . . . CPSD-M for M microphone pairs. With two microphones in an array, there is one possible pair of microphones. With three microphones in an array, there are three possible pairs of microphones. With four microphones in an array, there are six possible pairs of microphones. Some or all of the CPSD values may be computed and passed to phase profile determination block 804. Block 804 may determine a phase profile based on the microphone pair values. The determined phase profile may be stored in phase profile store 806 as one known talker.

The stored phase profiles may be compared to instantaneous phase profiles to determine whether a change of talker occurs and adapt processing of the microphone accordingly. Block 804 may continue to generate phase profiles for time periods after the time period corresponding to the stored phase profile in block 806. The instantaneous phase profile and stored phase profile may be input to phase profile comparator block 808. Change detection data, such as a similarity metric, may be computed by block 808 and passed to beamform controller 810. Additional data, such as microphone pairs corresponding to a direction of the detected talker, may also be passed to the beamform controller 810. The beamform controller 810 may determine control parameters for the beamformer 812 based on the change detection data. For example, when a change in talker is determined, the beamform controller 810 may increase the step size of the beamformer 812 to allow the beamformer 812 to quickly adapt to the new talker's position. The beamformer 812 may process the microphone signals S(1), S(2), S(3), . . . S(N) in accordance with the control parameters to obtain an enhanced speech audio signal. The processed audio signal may be passed to audio processing circuitry 814. Circuitry 814 may include, for example, a network controller for transmitting the processed audio to a remote device for speech recognition. Circuitry 814 may also receive the change detection data and/or an identification of the current talker from the phase profile comparator block 808. Circuitry 814 may change processing of the audio signal based on the phase profiles. For example, when a change is detected and the new talker, by aid of other algorithms, is identified as a private user, the circuitry 814 may prevent the transmission of recorded speech from the talker over a public network.

Figure 9:
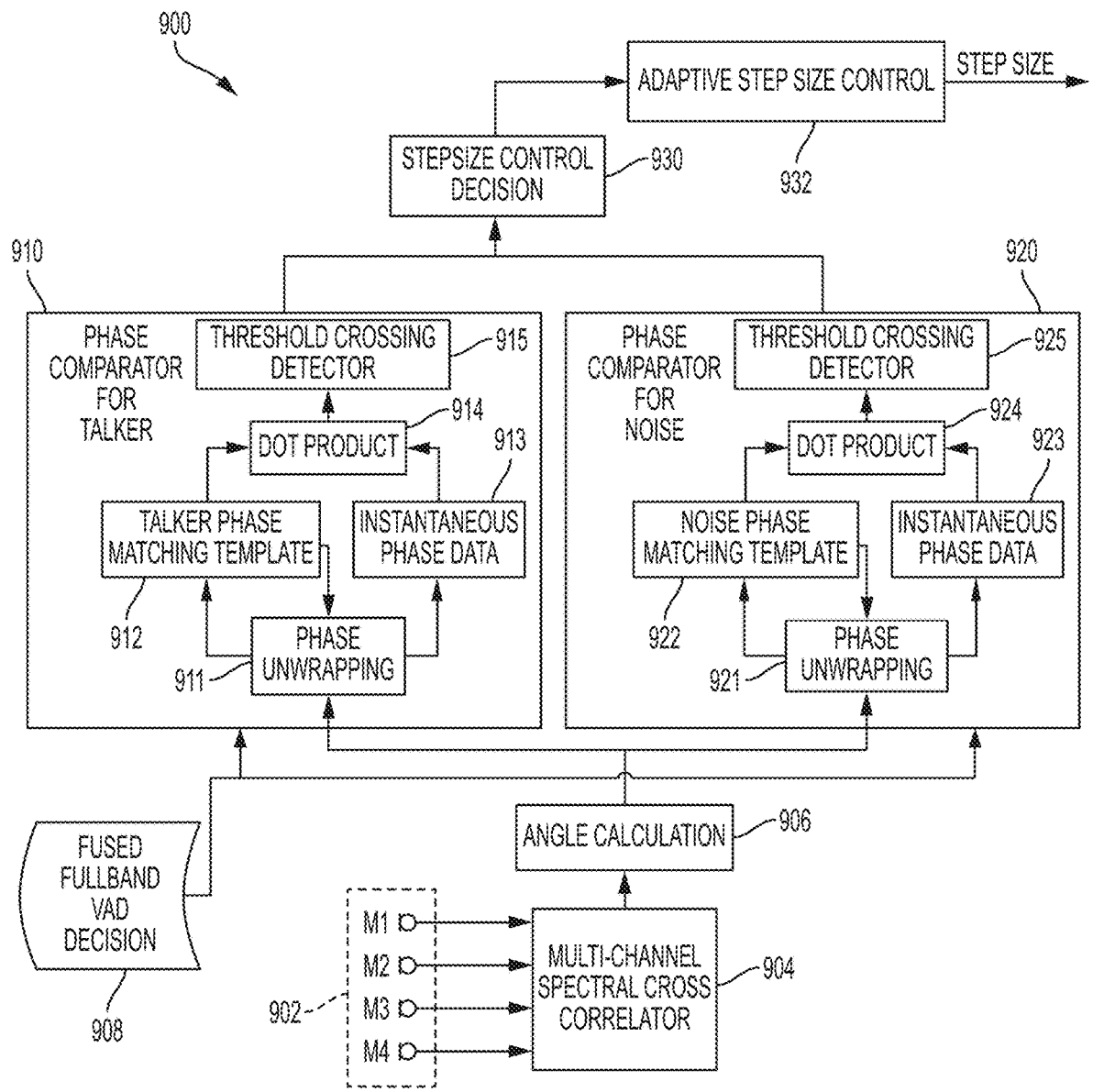
FIG. 9 is a block diagram illustrating example processing for determining a change in talker based on a dot product of talker phase profiles according to some embodiments of the disclosure.

Additional detail regarding one technique for determining a change in talker and its implementation in an integrated circuit is described with reference to FIG. 9. FIG. 9 is a block diagram illustrating example processing for determining a change in talker based on a dot product of talker phase profiles according to some embodiments of the disclosure. A system 900 may receive microphone signals from microphone array 902 and perform calculations of multi-channel spectral cross correlation at block 904 and angles at block 906. The prepared microphone signals may be further processed by blocks 910 and 920. Block 910 performs phase profile comparisons to identify talkers and/or changes in talkers. Block 920 performs phase profile comparisons to identify noise and/or determine whether high or low noise is present.

Blocks 910 and 920 perform similar computations on the angles received by block 906, thus only block 910 is described in detail. At block 911, phase unwrapping of the angle calculations brings all the wrapped phases, which are limited to a window of [−pi, pi], to their unwrapped values. For example, a value of 3 pi wrapped in a window of +/−pi will produce a value of −1 pi. Instantaneous phase data may be computed at block 913 based on the phase unwrapped microphone values. Additionally, a talker phase matching template may be formed at block 912 from the phase unwrapped values. At block 914, a dot product may be calculated of the instantaneous phase data from block 913 with a stored talker phase profile template of block 912. The result of the dot product may be compared to a threshold at block 915. When the value is greater than the threshold, a change detection flag may be produced by the block 910 to indicate a change in talkers.

The change detection flag may be provided to a stepsize control decision for some beamforming algorithms, in block 930. Block 930 may increase the stepsize for a certain period of time based on receiving the change detection flag. The increased stepsize allows an adaptive beamformer to quickly focus on the new talker. Block 930 may also determine stepsize for the beamformer based on noise detection from block 920. Block 920 may include blocks 921, 922, 923, 924, and 925 configured similarly to blocks 911, 912, 913, 914, and 915, respectively. Output from block 930 may indicate a noise level, such as a flag indicating when the noise level is below a threshold level. The stepsize determination by block 930 may include a first stepsize for content and a second stepsize for noise. The beamformer may use a corresponding stepsize value during periods of voice detection and no voice detection, respectively.

The outputs of blocks 910 and 920 are processed by decision logic block 930. In some embodiments, blocks 910 and 930 may be optionally present and/or enabled. For example, a decision block 908 may determine when to activate the blocks 910 and 920. For example, when a user begins speaking, the detection block 908 may enable blocks 910 and 920. When no voice activity is detected, the blocks 910 and 920 may be disabled to reduce power consumption.

Smart home products and other voice-activated products work in an environment in which multiple talkers are present, the room is highly reverberant, and both stationary as well as non-stationary background noise sources are present. Such noise sources include living room noise, TV noise or music system etc., which are challenging for noise reduction algorithms. In some applications, it is desired to detect the change of the talker when a smart home device is listening to multiple talkers. The accurate detection of a talker change can improve operation of further signal processing, such as noise reduction, on microphone inputs.

Figure 10:
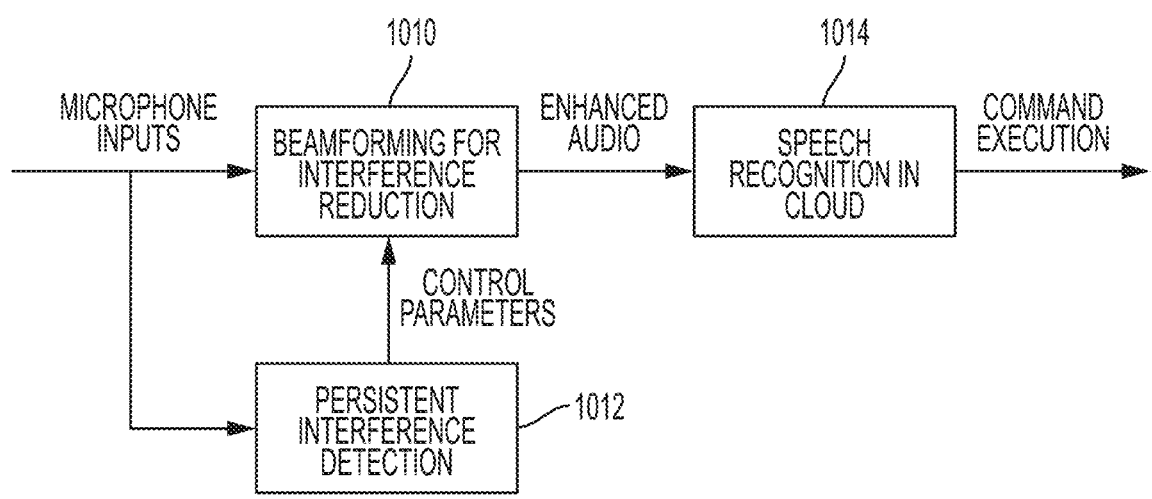
FIG. 10 is a block diagram illustrating an example beamformer according to some embodiments of the disclosure.

The functionality described for detecting sources may be incorporated into a beamform controller of an audio controller integrated circuit or other integrated circuit. The beamform controller may use a talker identification, such as based on talker phase profile, to modify control parameters for a beamformer that processes audio signals from the microphone array. FIG. 10 is a block diagram illustrating an example beamformer according to some embodiments of the disclosure. Microphones 202A-H provide microphone inputs to a beamformer 1010. The beamformer 1010 operates using control parameters, such as a voice step size and a noise step size, based on talker or interference source detection at block 1012. Enhanced audio produced by the beamformer 1010 may be sent to a remote system in cloud 1014 for speech recognition or other processing. The cloud 1014 produces a command from the enhanced audio and may execute the command or send the command back to the smart home device for execution.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Furthermore, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

The described methods are generally set forth in a logical flow of steps. As such, the described order and labeled steps of representative figures are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although smart home products are described, aspects of the described embodiments may be applied to other electronic devices, such as cellular phones. As another example, the described calculations may be performed by digital signal processors (DSPs), graphics processing units (GPUs), central processing units (CPUs), or other components. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving a first microphone signal and a second microphone signal from different locations relative to an audio source;
determining a first talker phase profile based, at least in part, on the first microphone signal and on the second microphone signal for a first time period;
determining a second talker phase profile based, at least in part, on the first microphone signal and on the second microphone signal for a second time period;
determining whether a change in talker occurred by comparing the first talker phase profile with the second talker phase profile, wherein a change in phase profile between the first talker phase profile and the second talker phase profile indicates a change in location of the talker,
wherein the step of determining whether a change in talker occurred comprises:
calculating a distance measure between the first talker phase profile and the second talker phase profile; and
determining whether the distance measure is higher than a threshold value; and
outputting parameters to a beamformer that modify the processing of the first microphone signal and the second microphone signal by the beamformer to adapt to a changed talker identified by the second talker phase profile being determined to be different from the first talker phase profile.

2. The method of claim 1, wherein the step of determining the first and second talker phase profiles comprises determining a phase of cross power spectral density between the first microphone signal and the second microphone signal.

3. The method of claim 1, wherein the distance measure comprises a dot product.

4. The method of claim 1, wherein the step of outputting parameters to the beamformer comprises adjusting a step size of an adaptive filter of the beamformer.

5. The method of claim 1, further comprising:
generating an indication of the change in talker; and
processing speech from a first talker received during the first time period separately from speech from a second talker received during the second time period.

6. The method of claim 5, wherein the step of processing speech comprises rejecting speech commands from talkers other than the second talker during the second time period.

7. The method of claim 1, further comprising:
receiving a third microphone signal; and
repeating the step of determining a first talker phase profile based on cross power spectral density between other pairs of microphones;
repeating the step of determining a second talker phase profile based on cross power spectral density between other pairs of microphones; and
determining whether a change in talker occurred based, at least in part, on the other pairs of microphones.

8. An apparatus, comprising:
a controller configured to perform steps comprising:
receiving a first microphone signal and a second microphone signal from different locations relative to an audio source;
determining a first talker phase profile based, at least in part, on the first microphone signal and on the second microphone signal for a first time period;
determining a second talker phase profile based, at least in part, on the first microphone signal and on the second microphone signal for a second time period;
determining whether a change in talker occurred by comparing the first talker phase profile with the second talker phase profile, wherein a change in phase profile between the first talker phase profile and the second talker phase profile indicates a change in location of the talker,
wherein the step of determining whether a change in talker occurred comprises:
calculating a distance measure between the first talker phase profile and the second talker phase profile; and
determining whether the distance measure is higher than a threshold value; and
outputting parameters to a beamformer that modify the processing of the first microphone signal and the second microphone signal by the beamformer to adapt to a changed talker identified by the second talker phase profile being determined to be different from the first talker phase profile.

9. The apparatus of claim 8, wherein the controller is configured to determine the first and second talker phase profiles by determining a phase of cross power spectral density between the first microphone signal and the second microphone signal.

10. The apparatus of claim 8, wherein the distance measure comprises a dot product.

11. The apparatus of claim 8, wherein the controller is configured to output parameters to the beamformer by adjusting a step size of an adaptive filter of the beamformer.

12. The apparatus of claim 8, wherein the controller is further configured to perform steps comprising:
generating an indication of the change in talker; and
processing speech from a first talker received during the first time period separately from speech from a second talker received during the second time period.

13. The apparatus of claim 12, wherein the controller is configured to reject speech commands from talkers other than the second talker during the second time period.

14. The apparatus of claim 8, wherein the controller is further configured to perform steps comprising:
receiving a third microphone signal; and
repeating the step of determining a first talker phase profile based on cross power spectral density between other pairs of microphones;
repeating the step of determining a second talker phase profile based on cross power spectral density between other pairs of microphones; and
determining whether a change in talker occurred based, at least in part, on the other pairs of microphones.

15. An apparatus, comprising:
a first microphone input node;
a second microphone input node;
a cross power spectral density computation block coupled to the first and the second microphone input node;
a phase profile determination block coupled to an output of the cross power spectral density computation block;
a phase profile store coupled to the phase profile determination block;
a phase profile comparator block coupled to the phase profile determination block and the phase profile store and configured to determine whether a change in talker occurred by comparing a first talker phase profile stored in the phase profile store with a second talker phase profile from the phase profile determination block,
wherein the phase comparator block determines whether a change in talker occurred by:
calculating a distance measure between the first talker phase profile and the second talker phase profile; and determining whether the distance measure is higher than a threshold value;

an audio processing block coupled to the phase profile comparator block; and a beamformer; and a beamform controller coupled to the beamformer and the phase profile comparator block wherein the beamform controller is configured to perform steps comprising outputting parameters to the beamformer that modify the processing of a first microphone signal from the first microphone input node and a second microphone signal from the second microphone input node by the beamformer to adapt to a changed talker identified by the second talker phase profile being determined to be different from the first talker phase profile.

16. The apparatus of claim 15, wherein the beamform controller is configured to generate a stepsize for controlling the beamformer.

17. The apparatus of claim 15, further comprising a third microphone input node, wherein the cross power spectral density computation block is configured to generate an output volume for each pair of microphones from the first microphone input node, the second microphone input node, and the third microphone input node.

* * * * *